(12) United States Patent
Akahori

(10) Patent No.: US 12,597,134 B2
(45) Date of Patent: Apr. 7, 2026

(54) IMAGE PROCESSING DEVICE, METHOD, AND PROGRAM

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 364 days.

(21) Appl. No.: 18/336,934

(22) Filed: Jun. 16, 2023

(65) Prior Publication Data

US 2024/0005495 A1    Jan. 4, 2024

(30) Foreign Application Priority Data

Jun. 29, 2022    (JP) ................................. 2022-105150

(51) Int. Cl.
| | |
|---|---|
| *G06K 9/00* | (2022.01) |
| *G06T 5/50* | (2006.01) |
| *G06T 7/00* | (2017.01) |
| *G06T 7/30* | (2017.01) |
| *G06T 15/00* | (2011.01) |

(52) U.S. Cl.
CPC .............. *G06T 7/0012* (2013.01); *G06T 5/50* (2013.01); *G06T 7/30* (2017.01); *G06T 15/00* (2013.01); *G06T 2207/10068* (2013.01); *G06T 2207/20221* (2013.01); *G06T 2207/30061* (2013.01)

(58) Field of Classification Search
CPC .............. G06K 9/00; A61B 6/487; G06T 7/00
USPC ....... 382/100, 103, 128–133, 154, 156, 168, 382/173, 181, 199, 214, 224, 254, 382/286–291, 305, 312, 219; 348/71; 378/4, 21
See application file for complete search history.

(56) References Cited

U.S. PATENT DOCUMENTS

| | | | | |
|---|---|---|---|---|
| 2011/0135172 A1* | 6/2011 | Kitamura | .................. | G06T 7/13 |
| | | | | 382/128 |
| 2016/0089011 A1* | 3/2016 | Shiraishi | .......... | A61B 1/000094 |
| | | | | 348/71 |
| 2018/0140359 A1* | 5/2018 | Koyrakh | ................ | A61B 34/20 |
| 2019/0005662 A1* | 1/2019 | Hirakawa | ................ | G06T 7/73 |
| 2019/0320878 A1* | 10/2019 | Duindam | .................. | G06T 7/30 |
| 2020/0020127 A1 | 1/2020 | Hirakawa | | |
| 2021/0052240 A1* | 2/2021 | Weingarten | ............ | A61B 6/487 |

FOREIGN PATENT DOCUMENTS

| | | |
|---|---|---|
| JP | 2009056239 | 3/2009 |
| JP | 2010220742 | 10/2010 |
| JP | 2020010735 | 1/2020 |
| JP | 2021030073 | 3/2021 |

\* cited by examiner

*Primary Examiner* — Seyed H Azarian
(74) *Attorney, Agent, or Firm* — JCIPRNET

(57) ABSTRACT

A processor acquires a three-dimensional image of a subject, acquires a real endoscopic image in a lumen structure of the subject, which is picked up by an endoscope inserted into the lumen structure of the subject, derives a virtual viewpoint in the three-dimensional image of the endoscope using the real endoscopic image and the three-dimensional image, acquires a radiation image of the subject in which the endoscope is inserted into the lumen structure, performs registration between the radiation image and the three-dimensional image, and superimposes and displays at least a part of the lumen structure included in the three-dimensional image, on the radiation image, based on the virtual viewpoint and a result of the registration.

4 Claims, 8 Drawing Sheets

IMAGE PROCESSING DEVICE, METHOD, AND PROGRAM

CROSS REFERENCE TO RELATED APPLICATIONS

The present application claims priority from Japanese Patent Application No. 2022-105150, filed on Jun. 29, 2022, the entire disclosure of which is incorporated herein by reference.

BACKGROUND

Technical Field

The present disclosure relates to an image processing device, method, and program.

Related Art

An endoscope having an endoscopic observation part and an ultrasonic observation part at a distal end thereof is inserted into a lumen structure such as a digestive organ or a bronchus of a subject, and an endoscopic image in the lumen structure and an ultrasound image of a site such as a lesion located outside an outer wall of the lumen structure are picked up. In addition, a biopsy in which a tissue of the lesion is collected with a treatment tool such as a forceps is also performed.

In a case of performing such a treatment using the endoscope, it is important that the endoscope accurately reaches a target position in the subject. Therefore, a positional relationship between the endoscope and a human body structure is grasped by continuously irradiating the subject with radiation from a radiation source during the treatment and performing fluoroscopic imaging to display the acquired fluoroscopic image in real time.

Here, since the fluoroscopic image includes overlapping anatomical structures such as organs, blood vessels, and bones in the subject, it is not easy to recognize the lumen and the lesion. Therefore, a three-dimensional image of the subject is acquired in advance before the treatment using a computed tomography (CT) device, a magnetic resonance imaging (MRI) device, and the like, an insertion route of the endoscope, a position of the lesion, and the like are simulated in advance in the three-dimensional image.

JP2009-056239A proposes a method of generating a virtual endoscopic image of an inside of a bronchus from a three-dimensional image, detecting a distal end position of an endoscope using a position sensor during a treatment, displaying the virtual endoscopic image together with a real endoscopic image picked up by the endoscope, and performing insertion navigation of the endoscope into the bronchus. In addition, JP2021-030073A proposes a method of detecting a distal end position of an endoscope with a position sensor provided at a distal end of the endoscope, detecting a posture of an imaging device that picks up a fluoroscopic image using a lattice-shaped marker, reconstructing a three-dimensional image from a plurality of acquired fluoroscopic images, and performing registration between the reconstructed three-dimensional image and a three-dimensional image such as a CT image acquired in advance.

However, in the methods disclosed in JP2009-056239A and JP2021-030073A, it is necessary to provide a sensor in the endoscope in order to detect the position of the endoscope. In order to avoid using the sensor, detecting the position of the endoscope from an endoscopic image reflected in the fluoroscopic image is considered. However, since a position in a depth direction orthogonal to the fluoroscopic image is not known in the fluoroscopic image, a three-dimensional position of the endoscope cannot be detected from the fluoroscopic image. Therefore, it is not possible to perform accurate navigation of the endoscope to a desired position in the subject.

SUMMARY OF THE INVENTION

The present invention has been made in view of the above circumstances, and an object of the present invention is to enable navigation of an endoscope to a desired position in a subject without using a sensor.

An image processing device according to a first aspect of the present disclosure comprises: at least one processor, in which the processor is configured to: acquire a three-dimensional image of a subject; acquire a real endoscopic image in a lumen structure of the subject, which is picked up by an endoscope inserted into the lumen structure of the subject; derive a virtual viewpoint in the three-dimensional image of the endoscope using the real endoscopic image and the three-dimensional image; acquire a radiation image of the subject in which the endoscope is inserted into the lumen structure; perform registration between the radiation image and the three-dimensional image; and superimpose and display at least a part of the lumen structure included in the three-dimensional image, on the radiation image, based on the virtual viewpoint and a result of the registration.

A second aspect of the present disclosure provides the image processing device according to the first aspect of the present disclosure, in which the processor is configured to: detect a position of the endoscope from the radiation image; and perform the registration by setting a projection condition of the three-dimensional image such that a projection position in a case in which the virtual viewpoint is projected onto the radiation image matches the position of the endoscope.

The term "match" includes not only a case of exact matching but also a case in which the positions are close to each other to the extent of substantial matching.

A third aspect of the present disclosure provides the image processing device according to the second aspect of the present disclosure, in which the processor is configured to further set the projection condition such that a specific anatomical structure included in the radiation image matches the specific anatomical structure included in a projection image derived by projecting the three-dimensional image onto the radiation image.

In the third aspect as well, the term "match" includes not only a case of exact matching but also a case in which the positions are close to each other to the extent of substantial matching.

A fourth aspect of the present disclosure provides the image processing device according to the second or third aspect of the present disclosure, in which the registration includes non-rigid registration.

A fifth aspect of the present disclosure provides the image processing device according to any one of the first to fourth aspects of the present disclosure, in which the processor is configured to: specify at least a part of the lumen structure included in the three-dimensional image to be projected onto the radiation image based on a position and an orientation of the virtual viewpoint; and superimpose and display the specified part of the lumen structure on the radiation image.

An image processing method according to the present disclosure comprises: acquiring a three-dimensional image of a subject; acquiring a real endoscopic image in a lumen structure of the subject, which is picked up by an endoscope inserted into the lumen structure of the subject; deriving a virtual viewpoint in the three-dimensional image of the endoscope using the real endoscopic image and the three-dimensional image; acquiring a radiation image of the subject in which the endoscope is inserted into the lumen structure; performing registration between the radiation image and the three-dimensional image; and superimposing and displaying at least a part of the lumen structure included in the three-dimensional image, on the radiation image, based on the virtual viewpoint and a result of the registration.

An image processing program according to the present disclosure causes a computer to execute a process comprising: acquiring a three-dimensional image of a subject; acquiring a real endoscopic image in a lumen structure of the subject, which is picked up by an endoscope inserted into the lumen structure of the subject; deriving a virtual viewpoint in the three-dimensional image of the endoscope using the real endoscopic image and the three-dimensional image; acquiring a radiation image of the subject in which the endoscope is inserted into the lumen structure; performing registration between the radiation image and the three-dimensional image; and superimposing and displaying at least a part of the lumen structure included in the three-dimensional image, on the radiation image, based on the virtual viewpoint and a result of the registration.

According to the present disclosure, it is possible to perform navigation of an endoscope to a desired position in a subject without using a sensor.

DETAILED DESCRIPTION

Figure 1:
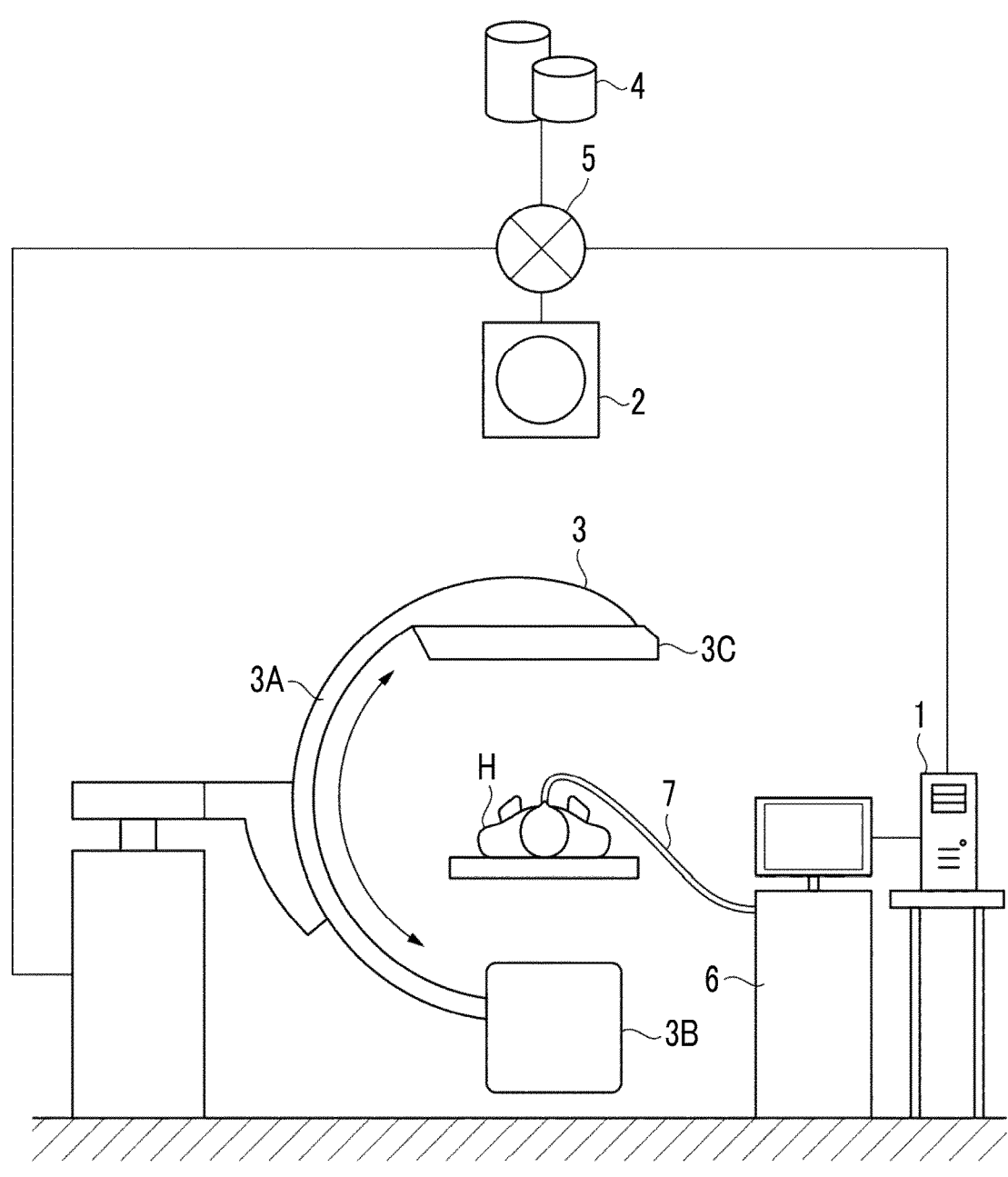
FIG. 1 is a diagram showing a schematic configuration of a medical information system to which an image processing device according to an embodiment of the present disclosure is applied.

Hereinafter, embodiments of the present disclosure will be described with reference to the drawings. First, a configuration of a medical information system to which an image processing device according to the present embodiment is applied will be described. FIG. 1 is a diagram showing a schematic configuration of the medical information system. In the medical information system shown in FIG. 1, a computer 1 including the image processing device according to the present embodiment, a three-dimensional image pick-up device 2, a fluoroscopic image pick-up device 3, and an image storage server 4 are connected in a communicable state via a network 5.

The computer 1 includes the image processing device according to the present embodiment, and an image processing program of the present embodiment is installed in the computer 1. The computer 1 is installed in a treatment room where a subject is treated as described below. The computer 1 may be a workstation or a personal computer directly operated by a medical worker who performs a treatment or may be a server computer connected thereto via a network. The image processing program is stored in a storage device of the server computer connected to the network or in a network storage in a state of being accessible from the outside, and is downloaded and installed in the computer 1 used by a doctor in response to a request. Alternatively, the image processing program is distributed by being recorded on a recording medium such as a digital versatile disc (DVD) or a compact disc read only memory (CD-ROM) and is installed on the computer 1 from the recording medium.

The three-dimensional image pick-up device 2 is a device that generates a three-dimensional image representing a treatment target site of a subject H by imaging the site, and is specifically, a CT device, an MRI device, a positron emission tomography (PET) device, and the like. The three-dimensional image including a plurality of tomographic images, which is generated by the three-dimensional image pick-up device 2, is transmitted to and stored in the image storage server 4. In addition, in the present embodiment, the treatment target site of the subject H is a lung, and the three-dimensional image pick-up device 2 is the CT device. A CT image including a chest portion of the subject H is acquired in advance as a three-dimensional image by imaging the chest portion of the subject H before a treatment on the subject H as described below and stored in the image storage server 4.

The fluoroscopic image pick-up device 3 includes a C-arm 3A, an X-ray source 3B, and an X-ray detector 3C. The X-ray source 3B and the X-ray detector 3C are attached to both end parts of the C-arm 3A, respectively. In the fluoroscopic image pick-up device 3, the C-arm 3A is configured to be rotatable and movable such that the subject H can be imaged from any direction. As will be described below, the fluoroscopic image pick-up device 3 acquires an X-ray image of the subject H by performing fluoroscopic imaging in which the subject H is irradiated with X-rays during the treatment on the subject H, and the X-rays transmitted through the subject H are detected by the X-ray detector 3C. In the following description, the acquired X-ray image will be referred to as a fluoroscopic image. The fluoroscopic image is an example of a radiation image according to the present disclosure. A fluoroscopic image T0 may be acquired by continuously irradiating the subject H with X-rays at a predetermined frame rate, or by irradiating the subject H with X-rays at a predetermined timing such that an endoscope 7 reaches a branch of the bronchus as described below.

The image storage server 4 is a computer that stores and manages various types of data, and comprises a large-capacity external storage device and database management software. The image storage server 4 communicates with another device via the wired or wireless network 5 and transmits and receives image data and the like. Specifically, various types of data including image data of the three-dimensional image acquired by the three-dimensional image pick-up device 2, and the fluoroscopic image acquired by the fluoroscopic image pick-up device 3 are acquired via the network, and managed by being stored in a recording medium such as a large-capacity external storage device. A storage format of the image data and the communication between the respective devices via the network 5 are based on a protocol such as digital imaging and communication in medicine (DICOM).

In the present embodiment, it is assumed that a biopsy treatment is performed in which while performing fluoroscopic imaging of the subject H, a part of a lesion such as a pulmonary nodule existing in the lung of the subject H is excised to examine the presence or absence of a disease in detail. For this reason, the fluoroscopic image pick-up device 3 is disposed in a treatment room for performing a biopsy. In addition, an ultrasonic endoscope device 6 is installed in the treatment room. The ultrasonic endoscope device 6 comprises an endoscope 7 whose distal end is attached with a treatment tool such as an ultrasound probe and a forceps. In the present embodiment, in order to perform a biopsy of the lesion, an operator inserts the endoscope 7 into the bronchus of the subject H, and picks up a fluoroscopic image of the subject H with the fluoroscopic image pick-up device 3 while picking up an endoscopic image of an inside of the bronchus with the endoscope 7. Then, the operator confirms a position of the endoscope 7 in the subject H in the fluoroscopic image while displaying the picked-up fluoroscopic image in real time, and moves a distal end of the endoscope 7 to a target position of the lesion. The bronchus is an example of the lumen structure of the present disclosure.

The endoscopic image is continuously acquired at a predetermined frame rate. In a case in which the fluoroscopic image T0 is acquired at a predetermined frame rate, a frame rate at which the endoscopic image is acquired may be the same as a frame rate at which the fluoroscopic image T0 is acquired. In addition, even in a case in which the fluoroscopic image T0 is acquired at an optional timing, the endoscopic image is acquired at a predetermined frame rate.

Here, lung lesions such as pulmonary nodules occur outside the bronchus rather than inside the bronchus. Therefore, after moving the endoscope 7 to the target position, the operator picks up an ultrasound image of the outside of the bronchus with the ultrasound probe, displays the ultrasound image, and performs treatment of collecting a part of the lesion using a treatment tool such as a forceps while confirming a position of the lesion in the ultrasound image.

Figure 2:
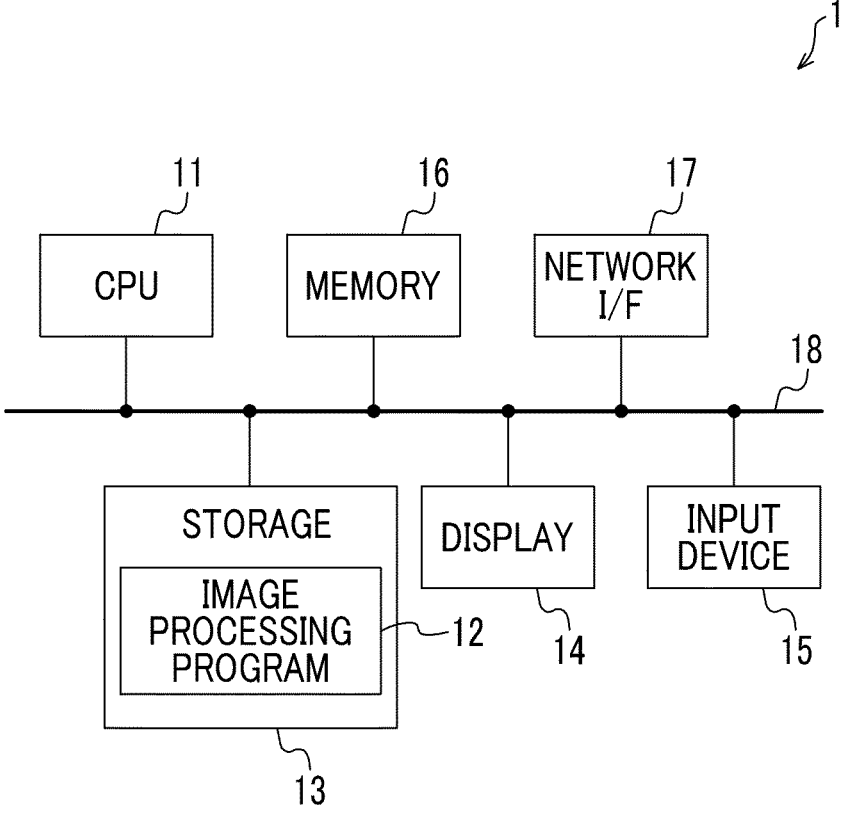
FIG. 2 is a diagram showing a schematic configuration of the image processing device according to the present embodiment.

Next, the image processing device according to the present embodiment will be described. FIG. 2 is a diagram showing a hardware configuration of the image processing device according to the present embodiment. As shown in FIG. 2, the image processing device 10 includes a central processing unit (CPU) 11, a non-volatile storage 13, and a memory 16 as a temporary storage region. In addition, the image processing device 10 includes a display 14 such as a liquid crystal display, an input device 15 such as a keyboard and a mouse, and a network interface (I/F) 17 connected to the network 5. The CPU 11, the storage 13, the display 14, the input device 15, the memory 16, and the network I/F 17 are connected to a bus 18. The CPU 11 is an example of the processor in the present disclosure.

The storage 13 is realized by, for example, a hard disk drive (HDD), a solid state drive (SSD), a flash memory, and the like. An image processing program 12 is stored in the storage 13 as a storage medium. The CPU 11 reads out the image processing program 12 from the storage 13, expands the image processing program 12 in the memory 16, and executes the expanded image processing program 12.

Figure 3:
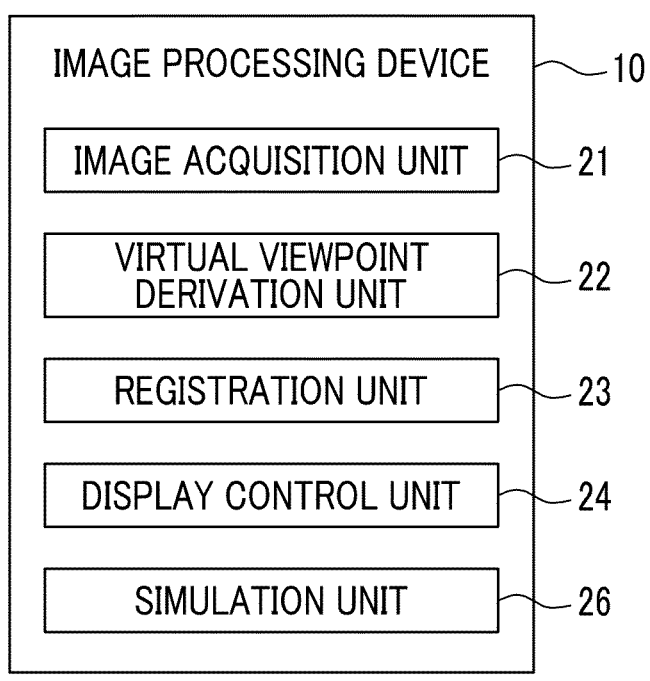
FIG. 3 is a functional configuration diagram of the image processing device according to the present embodiment.

Next, a functional configuration of the image processing device according to the present embodiment will be described. FIG. 3 is a diagram showing the functional configuration of the image processing device according to the present embodiment. As shown in FIG. 3, the image processing device 10 comprises an image acquisition unit 21, a virtual viewpoint derivation unit 22, a registration unit 23, and a display control unit 24. Then, by executing the image processing program 12 by the CPU 11, the CPU 11 functions as the image acquisition unit 21, the virtual viewpoint derivation unit 22, the registration unit 23, and the display control unit 24. In addition, in the present embodiment, a simulation program described below is installed in the computer 1. The CPU 11 functions as a simulation unit by executing the simulation program. FIG. 3 shows a simulation unit 26.

The image acquisition unit 21 acquires a three-dimensional image V0 of the subject H from the image storage server 4 in response to an instruction from the input device 15 by the operator. The acquired three-dimensional image V0 is assumed to be acquired before the treatment on the subject H. In addition, the image acquisition unit 21 acquires the fluoroscopic image T0 acquired by the fluoroscopic image pick-up device 3 during the treatment of the subject H. Further, the image acquisition unit 21 acquires an endoscopic image R0 acquired by the endoscope 7 during the treatment of the subject H. The endoscopic image acquired by the endoscope 7 is acquired by actually picking up the inside of the bronchus of the subject H with the endoscope 7. Therefore, in the following description, the endoscopic image acquired by the endoscope 7 will be referred to as a real endoscopic image R0. The real endoscopic image R0 is acquired at a predetermined frame rate regardless of a method of acquiring the fluoroscopic image T0. Therefore, the real endoscopic image R0 is acquired at a timing close to a timing at which the fluoroscopic image T0 is acquired. Therefore, the real endoscopic image R0 whose acquisition timing corresponds to the acquisition timing of the fluoroscopic image T0 exists in the fluoroscopic image T0.

Here, in the present embodiment, it is assumed that the simulation unit 26 performs a simulation of the treatment using the endoscope 7 using the three-dimensional image V0 before the treatment, and navigation for inserting the endoscope 7 into the bronchus and making the endoscope 7 reach a target point is performed using a result of the simulation. Hereinafter, the simulation will be described. In the simulation, the simulation unit 26 extracts a bronchial region from the three-dimensional image V0. In the present embodiment, the simulation unit 26 extracts the bronchial region from the three-dimensional image V0 by using a known computer-aided diagnosis (CAD; hereinafter referred to as CAD) algorithm. In addition, the simulation unit 26 may extract the bronchial region included in the three-dimensional image V0 by using, for example, any method disclosed in JP2010-220742A.

Then, the simulation unit 26 displays the extracted bronchial region on the display 14. The operator sets a route from an entrance of the bronchus to the target point where the lesion exists in the displayed bronchial region. In this case, it is preferable to set a start point of the navigation. As the start point of the navigation, for example, the first branch position of the bronchus need only be used. Then, on the route from the start point of the navigation to the target point, a position where the bronchus branches is set as a passing point. Then, the simulation unit 26 generates a virtual endoscopic image at the start point, the passing point, and the target point.

The virtual endoscopic image is a virtual image depicting an inner wall of the bronchus viewed from a viewpoint, with each point taken as a viewpoint. In the present embodiment, for example, the virtual endoscopic image is derived by using a method disclosed in JP2020-010735A. Specifically, a projection image is generated by performing central projection in which the three-dimensional image V0 on a plurality of lines of sight radially extending in a line-of-sight direction of the endoscope from viewpoints at the start point, the passing point, and the target point is projected onto a predetermined projection plane. This projection image is a virtual endoscopic image that is virtually generated as though the image has been picked up at the position of the endoscope 7. As a specific method of central projection, for example, a known volume rendering method or the like can be used. In addition, a vertical direction of a virtual endoscopic image VG0 can be determined based on an orientation of the viewpoint corresponding to each position (that is, twist of the endoscope 7). Therefore, the simulation unit 26 specifies the viewpoint of the virtual endoscopic image at the start point, the passing point, and the target point, that is, the position and the posture of the virtual endoscope, and generates a virtual endoscopic image corresponding to the position and the posture of the virtual endoscope.

Figure 4:
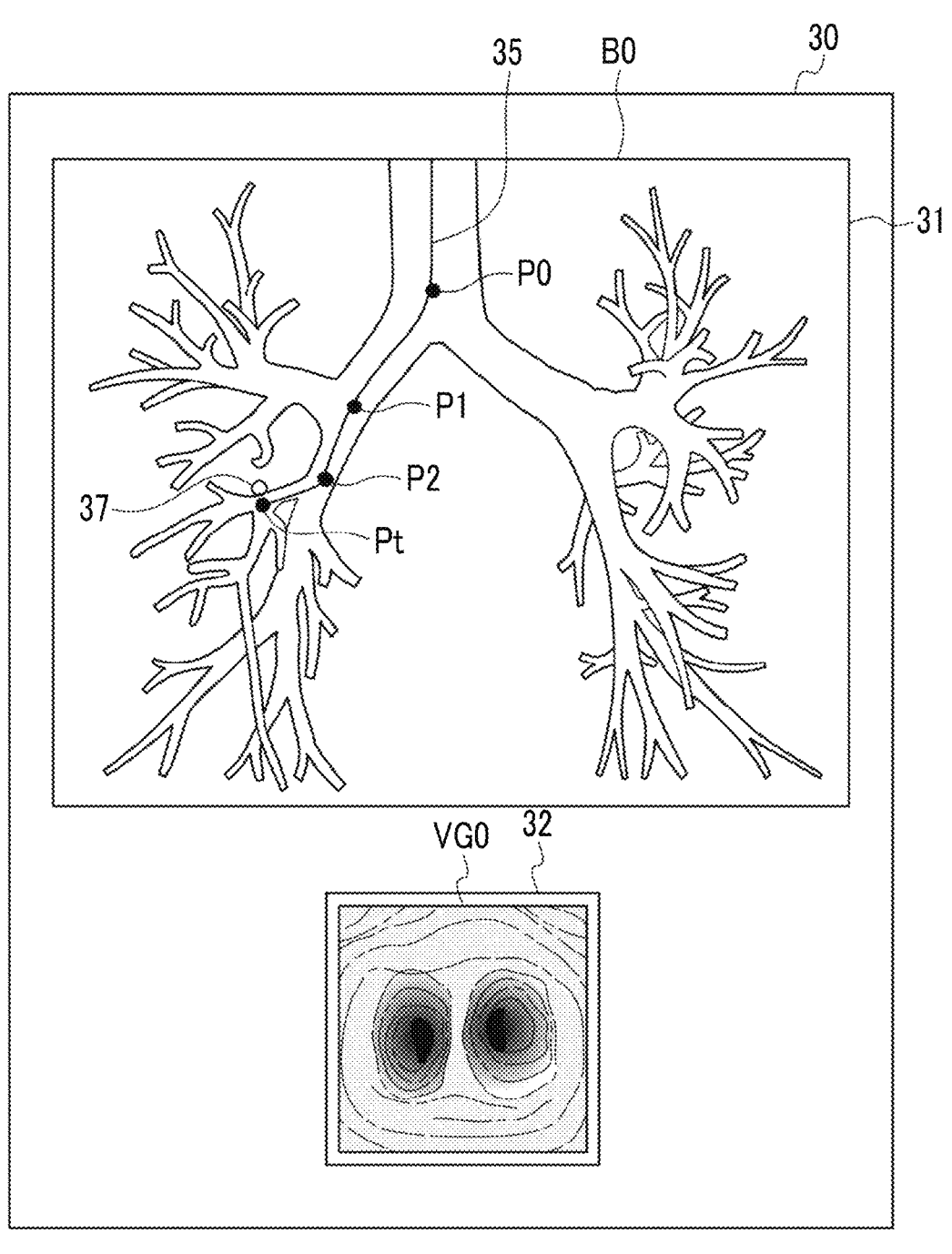
FIG. 4 is a diagram showing an information generation screen.

The simulation unit 26 displays an information generation screen for generating navigation information on the display 14 in a case in which the endoscope 7 is inserted into the bronchus. FIG. 4 is a diagram showing the information generation screen. As shown in FIG. 4, the information generation screen 30 includes a display region 31 of a bronchial region image and a display region 32 of the virtual endoscopic image VG0. On the information generation screen 30, the operator sets an insertion route 35 of the endoscope using the input device 15, and sets a start point P0, passing points P1 and P2, and a target point Pt of the navigation in the insertion route 35. The target point Pt is located at a position in the bronchus where a lesion 37 is present on an outside thereof. The virtual endoscopic image VG0 displayed in the display region 32 is a virtual endoscopic image generated at the start point P0, the passing points P1 and P2, and the target point Pt, and the virtual endoscopic images of the start point P0, the passing points P1 and P2, and the target point Pt can be switched in response to an instruction from the input device 15.

Here, an insertion direction of the endoscope 7 into the bronchus is a direction from a mouth or nose toward an end of the bronchus. Therefore, at each position in the bronchial region in the three-dimensional image V0, the direction of the endoscope 7 at that position, that is, the direction of the viewpoint is known. In addition, a method of inserting the endoscope 7 into the subject H is predetermined. For example, at a start of the insertion of the endoscope 7, a method of inserting the endoscope 7 is predetermined such that a ventral side of the subject H is an upper side of the real endoscopic image. Therefore, a degree to which the endoscope 7 is twisted around its major axis in the position of the derived viewpoint can be derived in advance by simulation based on a shape of the bronchial region. Therefore, the simulation unit 26 derives the orientation (that is, the line-of-sight direction and the twist) of the viewpoint at the start point P0, the passing points P1 and P2, and the target point Pt.

The simulation unit 26 stores a result of the simulation performed as described above in the storage 13. Then, in the treatment by the endoscope 7, the simulation unit 26 reads out the simulation result stored in the storage 13 and displays a navigation screen described below on the display 14.

The virtual viewpoint derivation unit 22 uses the real endoscopic image R0 and the three-dimensional image V0 to derive a virtual viewpoint in the three-dimensional image V0 corresponding to the viewpoint of the real endoscopic image R0. Therefore, the virtual viewpoint derivation unit 22 determines whether or not the endoscope 7 has reached the start point P0 of the simulation based on the real endoscopic image R0 and the virtual endoscopic image VG0 of the start point P0. In a case of performing the determination, the virtual viewpoint derivation unit 22 derives a depth map DM1 of the real endoscopic image R0 and a depth map DM2 of the virtual endoscopic image VG0 of the start point P0, and derives a degree of similarity between the depth map DM1 and the depth map DM2.

Figure 5:
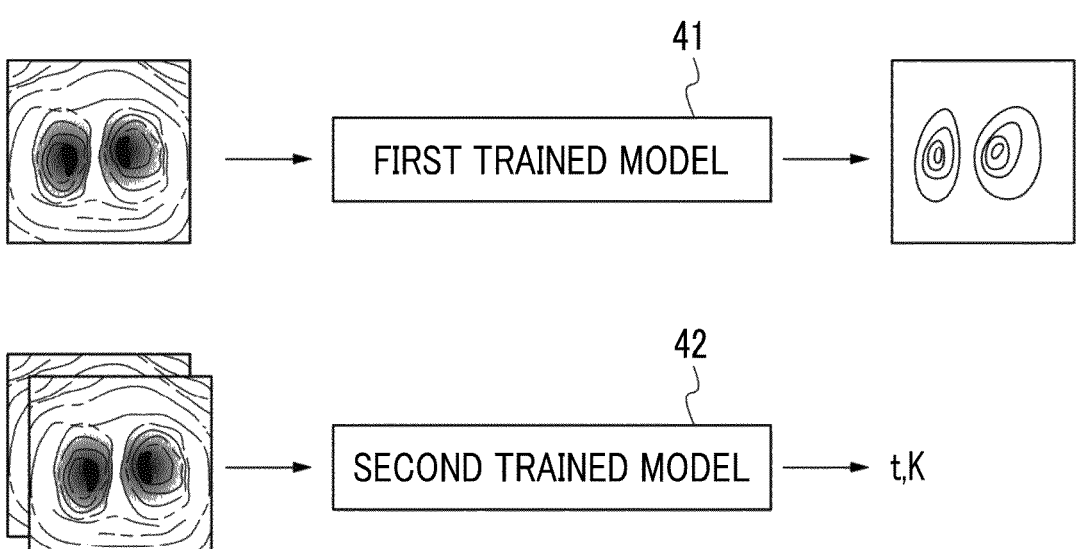
FIG. 5 is a diagram illustrating adjustment of a virtual viewpoint using a method of Zhou et al.

For the derivation of the depth map, for example, a method disclosed in "Unsupervised Learning of Depth and Ego-Motion from Video, Tinghui Zhou et al., April 2017" can be used. FIG. 5 is a diagram illustrating the method of Zhou et al. As shown in FIG. 5, the document of Zhou et al. discloses a method of training a first trained model 41 for deriving a depth map and a second trained model 42 for deriving a change in viewpoint. The virtual viewpoint derivation unit 22 derives a depth map using the first trained model 41 trained by the method disclosed in the document of Zhou et al. The first trained model 41 is constructed by subjecting a neural network to machine learning such that a depth map representing a distribution of a distance in a depth direction of one frame constituting a video image is derived from the frame.

The second trained model 42 is constructed by subjecting a neural network to machine learning such that a change in viewpoint between two frames constituting a video image is derived from the two frames. The change in viewpoint is a parallel movement amount t of the viewpoint and an amount of change in orientation between frames, that is, a rotation amount K.

In the method of Zhou et al., the first trained model 41 and the second trained model 42 are simultaneously trained without using training data, based on a relational expression between the change in viewpoint and the depth map to be satisfied between a plurality of frames. The first trained model 41 may be constructed using a large number of learning data including an image for training and a depth map as correct answer data for the image for training, without using the method of Zhou et al. In addition, the second trained model 42 may be constructed using a large number of learning data including a combination of two images for training and changes in viewpoints of the two images which are correct answer data.

Then, using the first trained model 41, the virtual viewpoint derivation unit 22 derives a first depth map DM1 representing a distribution of a distance in a depth direction of the real endoscopic image R0 from the real endoscopic image R0, and derives a second depth map DM2 representing a distribution of a distance in a depth direction of the virtual endoscopic image VG0 from the virtual endoscopic image VG0 of the start point P0. For the second depth map DM2, the simulation unit 26 may derive in advance a depth map of a bronchial structure in a case in which the viewpoint is set at the start point P0 using the bronchial region extracted from the three-dimensional image V0, and the derived depth map may be used as the second depth map DM2. Subsequently, the virtual viewpoint derivation unit 22 derives a degree of similarity between the first depth map DM1 and the second depth map DM2. For the degree of similarity, for example, a correlation value between the first depth map DM1 and the second depth map DM2 can be used. Then, the virtual viewpoint derivation unit 22 determines that the endoscope 7 has reached the start point P0 at a timing at which the degree of similarity is equal to or higher than a predetermined threshold value Th1. At a point in time at which the endoscope reaches the start point P0, the viewpoint of the start point P0 becomes a virtual viewpoint VP0 of the three-dimensional image V0 corresponding to the real endoscopic image R0.

The start point P0 is a position where the first branch of the bronchus appears, and only one hole is included in the real endoscopic image R0 until the endoscope 7 reaches the vicinity of the start point P0. On the other hand, the virtual endoscopic image VG0 of the start point P0 has two holes. Therefore, the virtual viewpoint derivation unit 22 may derive a degree of similarity between the real endoscopic image R0 and the virtual endoscopic image VG0 each time the real endoscopic image R0 is acquired, and determine that the endoscope 7 has reached the start point P0 at a timing at which the degree of similarity is equal to or higher than the predetermined threshold value Th1.

After the endoscope 7 reaches the start point P0, the virtual viewpoint derivation unit 22 derives the virtual viewpoint in the three-dimensional image V0 of the endoscope 7 using the real endoscopic image R0 and the three-dimensional image V0. The virtual viewpoint is a virtual viewpoint corresponding to the viewpoint of the real endoscopic image R0 acquired in the three-dimensional image V0.

Figure 6:
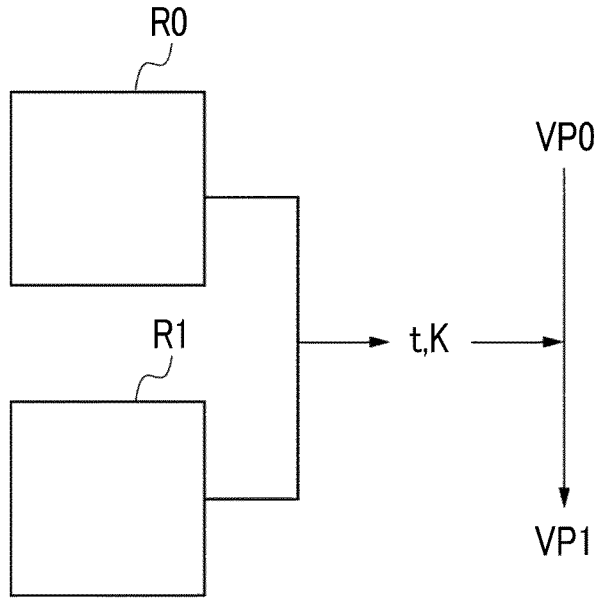
FIG. 6 is a diagram schematically showing derivation of a virtual viewpoint.

FIG. 6 is a diagram schematically showing derivation of the virtual viewpoint. As shown in FIG. 6, first, the virtual viewpoint derivation unit 22 uses the real endoscopic image R0 and a newly acquired real endoscopic image R1 to derive a change in viewpoint from the real endoscopic image R0 to the new real endoscopic image R1.

The virtual viewpoint derivation unit 22 derives a change in viewpoint between the real endoscopic image R0 and the new real endoscopic image R1 by using the second trained model 42 disclosed in the document of Zhou et al. shown in FIG. 5. The change in viewpoint is derived as the parallel movement amount t and the rotation amount K of the viewpoint from the real endoscopic image R0 to the new real endoscopic image R1.

Then, the virtual viewpoint derivation unit 22 derives a new virtual viewpoint VP1 by converting the virtual viewpoint VP0 corresponding to the real endoscopic image R0 using the derived change in viewpoint. In the present embodiment, deriving the virtual viewpoint VP0 means deriving a three-dimensional position and an orientation (that is, the line-of-sight direction and the twist) of the viewpoint in the three-dimensional image V0 of the virtual viewpoint. In a case in which the new real endoscopic image R1 is acquired, the virtual viewpoint derivation unit 22 uses the new real endoscopic image R1 and the real endoscopic image R0 acquired before the new real endoscopic image R1 to derive a new virtual viewpoint of the new real endoscopic image R1. The virtual viewpoint derivation unit 22 updates the virtual viewpoint until the endoscope 7 reaches the target point Pt. The determination of whether or not the endoscope 7 has reached the target point Pt need only be performed by determining whether or not a degree of similarity between a depth map of the real endoscopic image R0 and a depth map of a virtual endoscopic image VGt at the target point Pt is equal to or higher than the threshold value Th1, in the same manner as the determination of whether or not the endoscope 7 has reached the start point P0.

The simulation unit 26 derives the virtual endoscopic image in the virtual viewpoint derived by the virtual viewpoint derivation unit 22 in conjunction with the update of the virtual viewpoint. The display control unit 24 displays the virtual endoscopic image derived in conjunction with the update of the virtual viewpoint as described below, on a navigation screen described below.

The registration unit 23 performs registration between the acquired fluoroscopic image T0 and the three-dimensional image V0. The registration between the fluoroscopic image T0 and the three-dimensional image V0 is also performed using the fluoroscopic image T0 acquired after the endoscope 7 reaches the start point P0. The fluoroscopic image T0 to be registered by the registration unit 23 is acquired at a timing corresponding to the acquisition timing of the real endoscopic image R0 used in a case in which the virtual viewpoint derivation unit 22 derives the virtual viewpoint.

Figure 7:
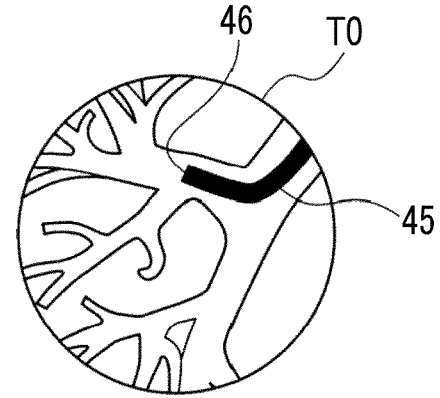
FIG. 7 is a diagram showing a fluoroscopic image.

First, the registration unit 23 detects a position of the endoscope 7 from the fluoroscopic image TO. FIG. 7 is a diagram showing the fluoroscopic image. As shown in FIG. 7, the fluoroscopic image T0 includes an image 45 of the endoscope 7. The registration unit 23 uses, for example, a trained model trained to detect a distal end 46 of the endoscopic image 45 from the fluoroscopic image T0 to detect the distal end 46 of the endoscopic image 45 from the fluoroscopic image T0. The detection of the distal end 46 of the endoscopic image 45 from the fluoroscopic image T0 is not limited to this. Any method can be used, such as a method using template matching. The distal end 46 of the endoscopic image 45 detected in this manner is the position of the endoscope 7, and is the position of the viewpoint of the real endoscopic image R0 corresponding to the fluoroscopic image T0.

Here, the fluoroscopic image T0 is a two-dimensional image. Therefore, the registration unit 23 performs registration between the two-dimensional fluoroscopic image T0 and the three-dimensional image V0. In the present embodiment, the registration unit 23 first projects the virtual viewpoint VP0 derived in the three-dimensional image V0 according to a provisional fluoroscopic projection condition to derive a projection virtual viewpoint VTP0. The provisional fluoroscopic projection condition includes a fluoroscopic projection viewpoint, a projection direction, and a distance from the fluoroscopic projection viewpoint to a projection plane. Here, in the fluoroscopic image pick-up device 3, an imaging direction in acquiring the fluoroscopic image T0 is set in advance to a direction from a ventral side to a dorsal side. In addition, a distance between the X-ray source 3B and the X-ray detector 3C in the fluoroscopic image pick-up device 3 is fixed. Therefore, the projection direction in the provisional fluoroscopic projection condition is set so as to match the imaging direction of the fluoroscopic image T0. In addition, the distance from the fluoroscopic projection viewpoint to the projection plane in the provisional fluoroscopic projection condition is set to the distance between the X-ray source 3B and the X-ray detector 3C in the fluoroscopic image pick-up device 3. The projection plane is a plane on which the fluoroscopic image T0 exists.

The fluoroscopic projection viewpoint in the provisional fluoroscopic projection condition is set such that a position where the virtual viewpoint VP0 derived by the virtual viewpoint derivation unit 22 in the three-dimensional image V0 is projected onto the projection plane matches the position of the endoscope 7 (that is, the distal end 46 of the endoscopic image 45) in the fluoroscopic image T0. In this case, the registration unit 23 projects the virtual viewpoint VP0 from a provisional fluoroscopic projection viewpoint onto the projection plane, that is, the fluoroscopic image T0, while changing the fluoroscopic projection viewpoint in a two-dimensional shape in a plane orthogonal to the projection direction, and sets the provisional fluoroscopic projection viewpoint in which a position of the projected virtual viewpoint matches the position of the endoscope 7 in the fluoroscopic image T0 as the fluoroscopic projection viewpoint. The phrase "position where the virtual viewpoint VP0 is projected onto the projection plane matches the position of the endoscope 7 in the fluoroscopic image T0" may represent exact matching, and may represent close matching to the extent that the position where the virtual viewpoint VP0 is projected onto the projection plane and the position of the endoscope 7 in the fluoroscopic image T0 are deemed to match each other.

The registration unit 23 adjusts the provisional fluoroscopic projection condition such that a pseudo fluoroscopic image VT0 derived by projecting the three-dimensional image V0 onto the projection plane according to the set provisional fluoroscopic projection condition matches the fluoroscopic image T0. In this case, the registration unit 23 extracts a specific anatomical structure, such as a bone part, from the three-dimensional image V0 and the fluoroscopic image T0, projects the specific anatomical structure extracted from the three-dimensional image V0 according to the provisional fluoroscopic projection condition, and adjusts the provisional fluoroscopic projection condition such that the projected anatomical structure matches the anatomical structure in the fluoroscopic image T0. Then, the registration unit 23 sets the adjusted provisional fluoroscopic projection condition as the final fluoroscopic projection condition.

In a case in which the position where the virtual viewpoint VP0 is projected onto the projection plane matches the position of the endoscope 7 in the fluoroscopic image T0, and/or in a case in which the projected anatomical structure matches the anatomical structure in the fluoroscopic image T0, the registration unit 23 may perform non-rigid registration between the pseudo fluoroscopic image VT0 and the fluoroscopic image T0. In this case, the registration unit 23 need only perform the non-rigid registration by extracting a lung field region from the fluoroscopic image T0 and the pseudo fluoroscopic image VT0 derived by the determined fluoroscopic projection condition, deriving a deformation amount of the pseudo fluoroscopic image VT0 with respect to the fluoroscopic image T0 such that the lung field region extracted from the pseudo fluoroscopic image VT0 matches the lung field region extracted from the fluoroscopic image T0, and deforming the pseudo fluoroscopic image VT0 based on the deformation amount.

Figure 8:
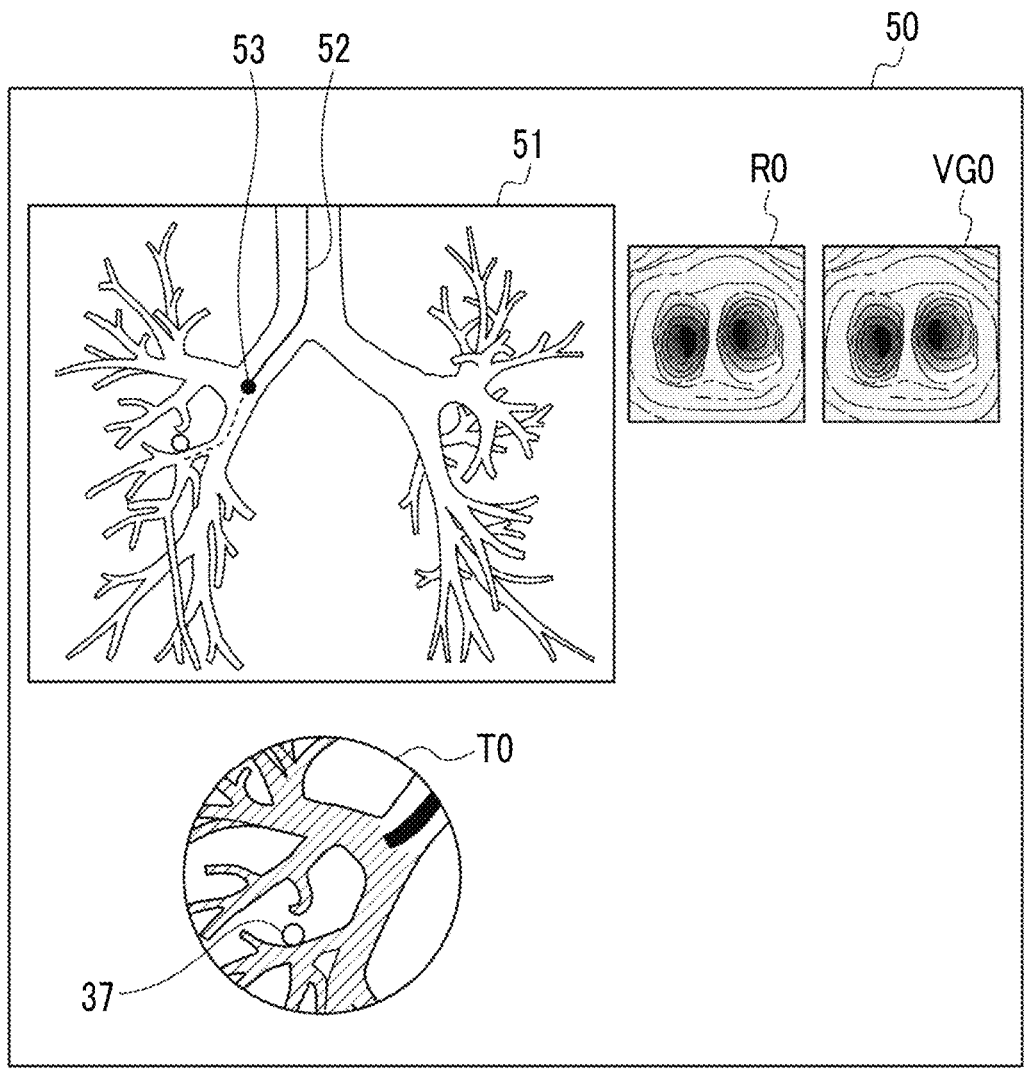
FIG. 8 is a diagram showing a navigation screen.

The display control unit 24 displays the navigation screen on the display 14. FIG. 8 is a diagram showing the navigation screen. As shown in FIG. 8, a bronchial region image 51, a fluoroscopic image T0, a real endoscopic image R0, and a virtual endoscopic image VG0 are displayed on the navigation screen 50. A route 52 for navigation of the endoscope 7 to the target point Pt is displayed on the bronchial region image 51. In addition, a current position 53 of the endoscope 7 is shown on the route 52. In addition, in FIG. 8, the route 52 through which the endoscope 7 has passed is shown by a solid line, and the route 52 through which the endoscope 7 has not passed is shown by a broken line.

Figure 9:
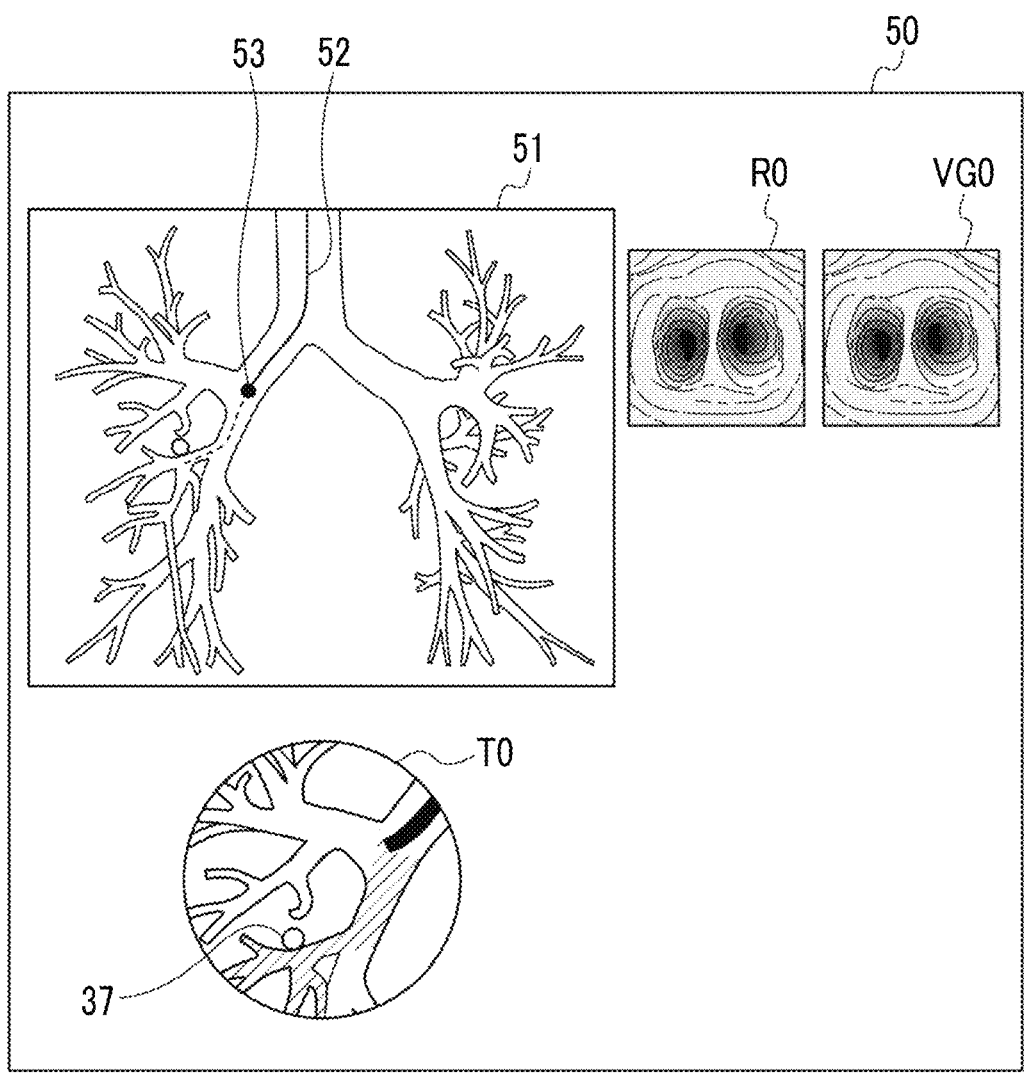
FIG. 9 is a diagram showing a navigation screen.

In the present embodiment, the display control unit 24 specifies at least a part of the bronchus included in the three-dimensional image V0 to be projected onto the fluoroscopic image T0 based on the position and the orientation of the virtual viewpoint derived by the virtual viewpoint derivation unit 22. Then, the specified part of the bronchus is superimposed and displayed on the fluoroscopic image T0. In the present embodiment, the display control unit 24 specifies the bronchus in the three-dimensional image V0 located on a traveling direction side of the endoscope 7, which is the orientation of the virtual viewpoint, that is, the direction in which the virtual viewpoint is directed, from the position of the virtual viewpoint, that is, the current position 53 of the endoscope 7, to a part of the bronchus projected onto the fluoroscopic image T0. In FIG. 8, only the bronchus in the three-dimensional image V0 located on the traveling direction side of the endoscope 7 from the virtual viewpoint, that is, the current position 53 of the endoscope 7 is superimposed and displayed on the fluoroscopic image T0. In addition, as shown in FIG. 9, in the traveling direction of the endoscope 7, only the bronchus through which the endoscope 7 passes until the endoscope 7 reaches the lesion 37 may be superimposed and displayed on the fluoroscopic image T0. FIGS. 8 and 9 show a state in which the bronchus is superimposed and displayed by imparting hatching to the bronchus included in the fluoroscopic image T0.

Figure 10:
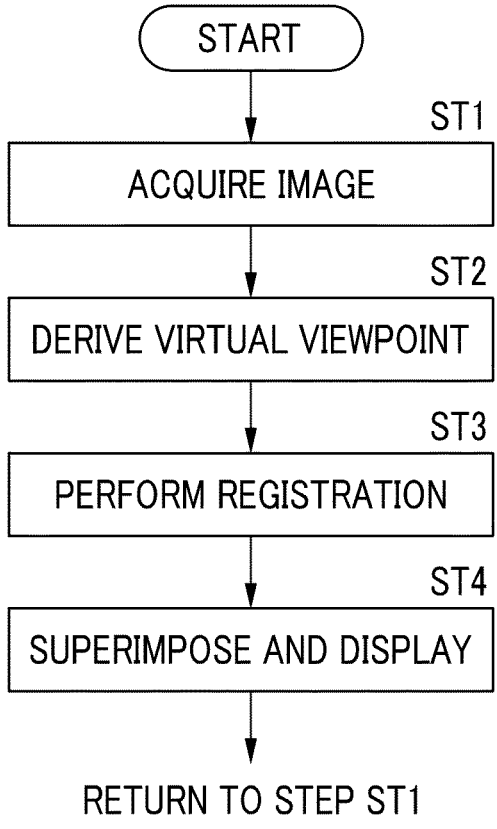
FIG. 10 is a flowchart illustrating processing performed in the present embodiment.

Next, a process performed in the present embodiment will be described. FIG. 10 is a flowchart showing the process performed in the present embodiment. It is assumed that the three-dimensional image V0 is acquired by the image acquisition unit 21 and stored in the storage 13, and the navigation information of the endoscope 7 is generated by the simulation unit 26 and stored in the storage 13. First, the image acquisition unit 21 acquires the fluoroscopic image T0 and the real endoscopic image R0 (image acquisition: step ST1). Next, the virtual viewpoint derivation unit 22 derives the virtual viewpoint VP0 in the three-dimensional image V0 of the endoscope 7 using the real endoscopic image R0 and the three-dimensional image V0 (step ST2).

Next, the registration unit 23 performs registration between the acquired fluoroscopic image T0 and the three-dimensional image V0 (step ST3). Then, the display control unit 24 superimposes and displays at least a part of the bronchus included in the three-dimensional image V0 on the fluoroscopic image T0 based on the virtual viewpoint and a result of the registration (step ST4), and returns to step ST1.

As described above, in the present embodiment, the virtual viewpoint VP0 in the three-dimensional image V0 of the endoscope 7 is derived using the real endoscopic image R0 and the three-dimensional image V0, registration between the fluoroscopic image T0 and the three-dimensional image V0 is performed, and at least a part of the bronchus included in the three-dimensional image V0 is superimposed and displayed on the fluoroscopic image T0 based on the virtual viewpoint and the result of the registration. Therefore, navigation of the endoscope 7 to a desired position in the subject H can be performed based on the three-dimensional image V0 superimposed on the fluoroscopic image T0 even without detecting the distal end of the endoscope 7 using a sensor.

In the above-described embodiment, a case in which the image processing device of the present disclosure is applied to observation of the bronchus has been described, but the present disclosure is not limited thereto, and the present disclosure can also be applied in a case in which a lumen structure such as a stomach, a large intestine, and a blood vessel is observed with an endoscope.

In addition, in the embodiment, for example, as a hardware structure of a processing unit that executes various types of processing such as the image acquisition unit 21, the virtual viewpoint derivation unit 22, the registration unit 23, and the display control unit 24, various processors shown below can be used. The various types of processors include, as described above, a CPU which is a general-purpose processor that executes software (program) to function as various types of processing units, as well as a programmable logic device (PLD) which is a processor having a circuit configuration that can be changed after manufacturing such as a field programmable gate array (FPGA), a dedicated electrical circuit which is a processor having a circuit configuration exclusively designed to execute specific processing such as an application specific integrated circuit (ASIC), and the like.

One processing unit may be configured of one of the various types of processors, or a combination of two or more processors of the same type or different types (for example, a combination of a plurality of FPGAs, or a combination of a CPU and an FPGA). Further, a plurality of processing units may be configured of one processor.

As an example of configuring a plurality of processing units with one processor, first, there is a form in which, as typified by computers such as a client and a server, one processor is configured by combining one or more CPUs and software, and the processor functions as a plurality of processing units. Second, there is a form in which, as typified by a system on chip (SoC) and the like, in which a processor that implements functions of an entire system including a plurality of processing units with one integrated circuit (IC) chip is used. As described above, the various types of processing units are configured using one or more of the various types of processors as a hardware structure.

Furthermore, as the hardware structure of the various types of processors, more specifically, an electric circuit (circuitry) in which circuit elements such as semiconductor elements are combined can be used.

What is claimed is:

1. An image processing device comprising:
at least one processor,
wherein the processor is configured to:
acquire a three-dimensional image of a subject;
acquire a real endoscopic image in a lumen structure of the subject, which is picked up by an endoscope inserted into the lumen structure of the subject;
derive a virtual viewpoint in the three-dimensional image of the endoscope using the real endoscopic image and the three-dimensional image;
acquire a radiation image of the subject in which the endoscope is inserted into the lumen structure;
detect a position of the endoscope from the radiation image;
perform registration between the radiation image and the three-dimensional image by setting a projection condition of the three-dimensional image such that a projection position in a case in which the virtual viewpoint is projected onto the radiation image matches the position of the endoscope and such that a specific anatomical structure included in the radiation image matches the specific anatomical structure included in a projection image derived by projecting the three-dimensional image onto the radiation image, wherein the registration includes non-rigid registration; and
superimpose and display at least a part of the lumen structure included in the three-dimensional image, on the radiation image, based on the virtual viewpoint and a result of the registration.

2. The image processing device according to claim 1, wherein the processor is configured to:

specify at least a part of the lumen structure included in the three-dimensional image to be projected onto the radiation image based on a position and an orientation of the virtual viewpoint; and
superimpose and display the specified part of the lumen structure on the radiation image.

3. An image processing method comprising:
acquiring a three-dimensional image of a subject;
acquiring a real endoscopic image in a lumen structure of the subject, which is picked up by an endoscope inserted into the lumen structure of the subject;
deriving a virtual viewpoint in the three-dimensional image of the endoscope using the real endoscopic image and the three-dimensional image;
acquiring a radiation image of the subject in which the endoscope is inserted into the lumen structure;
detecting a position of the endoscope from the radiation image;
performing registration between the radiation image and the three-dimensional image by setting a projection condition of the three-dimensional image such that a projection position in a case in which the virtual viewpoint is projected onto the radiation image matches the position of the endoscope and such that a specific anatomical structure included in the radiation image matches the specific anatomical structure included in a projection image derived by projecting the three-dimensional image onto the radiation image, wherein the registration includes non-rigid registration; and
superimposing and displaying at least a part of the lumen structure included in the three-dimensional image, on the radiation image, based on the virtual viewpoint and a result of the registration.

4. A non-transitory computer-readable storage medium that stores an image processing program causing a computer to execute a process comprising:
acquiring a three-dimensional image of a subject;
acquiring a real endoscopic image in a lumen structure of the subject, which is picked up by an endoscope inserted into the lumen structure of the subject;
deriving a virtual viewpoint in the three-dimensional image of the endoscope using the real endoscopic image and the three-dimensional image;
acquiring a radiation image of the subject in which the endoscope is inserted into the lumen structure;
detecting a position of the endoscope from the radiation image;
performing registration between the radiation image and the three-dimensional image by setting a projection condition of the three-dimensional image such that a projection position in a case in which the virtual viewpoint is projected onto the radiation image matches the position of the endoscope and such that a specific anatomical structure included in the radiation image matches the specific anatomical structure included in a projection image derived by projecting the three-dimensional image onto the radiation image, wherein the registration includes non-rigid registration; and
superimposing and displaying at least a part of the lumen structure included in the three-dimensional image, on the radiation image, based on the virtual viewpoint and a result of the registration.

* * * * *